(12) United States Patent
Zhang

(10) Patent No.: US 8,483,047 B2
(45) Date of Patent: Jul. 9, 2013

(54) METHOD, TERMINAL AND SYSTEM STRUCTURE FOR TRANSMITTING AND RECEIVING SERVICES IN MICROWAVE COMMUNICATION

(75) Inventor: Xuekun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 13/012,345

(22) Filed: Jan. 24, 2011

(65) Prior Publication Data

US 2011/0182175 A1    Jul. 28, 2011

(30) Foreign Application Priority Data

Jan. 22, 2010    (CN) .......................... 2010 1 0002625

(51) Int. Cl.
*H04J 1/16* (2006.01)
(52) U.S. Cl.
USPC ........................................ 370/217; 370/225
(58) Field of Classification Search
USPC .................................................. 370/216–228
See application file for complete search history.

(56) References Cited

U.S. PATENT DOCUMENTS

| | | | |
|---|---|---|---|
| 6,262,973 B1* | 7/2001 | Shiraishi et al. | 370/228 |
| 2004/0092287 A1* | 5/2004 | Hori et al. | 455/552.1 |
| 2008/0056121 A1* | 3/2008 | Tsai et al. | 370/216 |
| 2008/0136554 A1* | 6/2008 | He et al. | 333/101 |
| 2008/0254749 A1* | 10/2008 | Ashkenazi et al. | 455/69 |
| 2010/0172293 A1* | 7/2010 | Toth et al. | 370/328 |
| 2010/0215054 A1* | 8/2010 | Yakov | 370/468 |
| 2011/0292813 A1* | 12/2011 | Dunbar et al. | 370/244 |
| 2012/0070147 A1* | 3/2012 | Mizutani et al. | 398/25 |

FOREIGN PATENT DOCUMENTS

| | | |
|---|---|---|
| CN | 101047547 A | 10/2007 |
| CN | 101286818 A | 10/2008 |
| CN | 101488777 A | 7/2009 |
| CN | 101488829 A | 7/2009 |
| CN | 101753203 B | 3/2013 |

OTHER PUBLICATIONS

The Intellectual Property Office of the People's Republic of China, 1st Office Action in Chinese Application No. 201010002625.3 (Mar. 2, 2012).

* cited by examiner

*Primary Examiner* — Andrew Lee
(74) *Attorney, Agent, or Firm* — Leydig, Voit & Mayer, Ltd.

(57) ABSTRACT

A method, a terminal, and a system structure for transmitting and receiving services, which relate to the field of communication technology, so as to realize coordinated operation between Adaptive Code and Modulation and Hitless Switch Mode functions in a microwave communication system, thus improving system transmission efficiency and transmission reliability. The method for transmitting services includes the following steps. A transmitting end of an active link receives an ACM switching indication fed back by a receiving end of the active link, and a transmitting end of a standby link receives an ACM switching indication fed back by a receiving end of the standby link; the transmitting end of the active link performs ACM switching on the services transmitted through the active link and transmits the services; and the transmitting end of the standby link performs ACM switching on the services transmitted through the standby link and transmits the services.

15 Claims, 9 Drawing Sheets

METHOD, TERMINAL AND SYSTEM STRUCTURE FOR TRANSMITTING AND RECEIVING SERVICES IN MICROWAVE COMMUNICATION

CROSS-REFERENCE TO RELATED APPLICATION

This application claims priority under 35 U.S.C. 119 to Chinese Patent Application No. 201010002625.3, filed on Jan. 22, 2010, which is hereby incorporated by reference in its entirety.

FIELD OF THE INVENTION

The present invention relates to the field of communication technologies, and in particular, to a method, a terminal, and a system structure for transmitting and receiving services in microwave communication.

BACKGROUND OF THE INVENTION

An Adaptive Code and Modulation (ACM) technology is a transmission technology having a channel adaptive characteristic. According to the ACM technology that is based on channel estimation, an available condition of an air interface link is estimated in real time through a detecting mechanism of a receiving end, a switching indication for a coding manner and a modulation mode is automatically generated and then fed back to a transmitting end through a feedback channel, and the transmitting end automatically changes the modulation mode and the coding manner of services according to the switching indication, so as to reach a compromise between system capacity and system anti-interference ability, thus optimizing whole transmission performance of the system, and achieving highly-efficient and reliable transmission. With the development of the microwave communication technology, a further requirement is set for the performance of a microwave communication system. The existing microwave communication system must have abilities of changing and adjusting in real time the coding manner and the modulation mode of the system according to the channel quality, that is to say, an ACM function becomes one of the indispensable functions in the microwave communication system.

In a microwave device, since quality of an air interface fluctuates dramatically over time, in order to ensure reliable transmission of user services, the microwave device protects the user services by adopting a Hitless Switch Mode (HSM) protection manner. The HSM function mainly completes service protection at sides of wave channels, and is one of the essential functions of conventional microwave devices. In the HSM protection manner, services of the same link are transmitted through two different wave channels, and the receiving end compares quality of services received through the two channels and selects a service with better quality.

With the rapid development of the microwave communication technology, the ACM function becomes more and more important while the HSM function is one of the essential functions of traditional microwave devices. The HSM function realizes service protection, the ACM function realizes link protection, and the ACM function combined with the HSM function can effectively improve transmission efficiency and transmission reliability of the microwave system. Therefore, how to realize coordinated operation between the ACM and the HSM in the microwave communication system becomes a problem that needs to be solved.

Referring to a schematic view of principle as shown in FIG. 1, in the conventional art, a device transmits services of the same path through a Hot Standby (HSB) service dual transmitting unit to an active link and a standby link for transmission. During the transmission, an ACM unit of the standby link remains Off all the time, and an ACM unit of the active link remains "On." The ACM unit of the active link performs ACM switching according to signal quality of the active link, and transmits the service after ACM switching to the standby link through the service dual transmitting unit of ACM switching, and the standby link follows the active link to perform ACM switching and maintains consistency with the active link, so as to guarantee bandwidth consistency of master and slave services. An HSM unit of the receiving end only performs HSM switching according to a code-uncorrectable signal of the active/standby link. After HSM switching, the active and standby links still perform ACM switching according to the signal quality of the active link.

In the implementation of the coordinated operation between the ACM and the HSM, the inventor finds that the conventional art has at least the following problems. If the active link keeps degrading while the standby link has better signal quality, the ACM of the active link continues to be switched downward, and the standby link has to follow the active link to be switched downward, so capacity of the air interface decreases. As shown in FIG. 1, the active link has bad signal quality and can only transmit 2M services, and the standby link has good signal quality and can transmit 8M services; but as the standby link and the active link are interlinked, the standby link can only transmit 2M services. If the signal quality of the active link is not restored, both the active and standby links operate in a low-modulation mode, and the capacity of the air interface cannot be restored. In the process of ACM switching, if the services of both links have no burst error code, the HSM can only operate when being switched to a minimum modulation mode. Therefore, the system has lower transmission efficiency. Moreover, if the active link keeps being optimized while the standby link has bad signal quality, the modulation mode of the active and standby links continue to be switched upward, and the standby link may be interrupted. At this time, if a transient error code occurs in the active link, an error occurs in HSM switching, resulting in poor reliability.

SUMMARY OF THE INVENTION

In one embodiment of the present invention, a method is provided for transmitting services in a microwave communication, so as to effectively improve transmission efficiency and transmission reliability of a microwave communication system when an ACM and an HSM are used coordinately in the microwave communication system.

In order to achieve the above purpose, an embodiment of the present invention adopts the following technical solution.

A method for transmitting services in microwave communication includes:

receiving, by a transmitting end of an active link, an ACM switching indication fed back by a receiving end of the active link, and receiving, by a transmitting end of a standby link, an ACM switching indication fed back by a receiving end of the standby link; and performing, by the transmitting end of the active link, ACM switching, according to the received ACM switching indication, on services transmitted through the active link, and transmitting the services; performing, by the transmitting end of the standby link, ACM switching, according to the received ACM switching indication, on services transmitted through the standby link, and transmitting the services.

Compared with the conventional art, after the above technical solution is adopted, with the method for transmitting services according to the embodiment of the present invention, logic implementation and function division of ACMs of the active link and the standby link are completely independent, and the active link and the standby link may transmit asymmetrical services according to link conditions of respective air interfaces to guarantee reliable transmission of services of the active link and the standby link and improve the transmission efficiency of the air interfaces at the same time. Moreover, the active link does not need to dispose an ACM service dual transmitting unit, two service dual transmitting units of the transmitting end are reduced to one, and the ACMs of the active link and the standby link are switched independently without a coupling relationship, so the design and implementation complexity of the system is reduced.

Another embodiment of the present invention provides a method for transmitting services in a microwave communication, so as to effectively improve transmission efficiency and transmission reliability of a microwave communication system when an ACM and an HSM are used coordinately in the microwave communication system.

In order to achieve the foregoing, an embodiment of the present invention adopts the following technical solution:

receiving, by a receiving end of an active link and a receiving end of a standby link, services which are transmitted through each link and on which ACM switching is performed respectively;

detecting, by the receiving end of the active link, a signal quality condition of the active link, generating an ACM switching indication of the active link, and informing, through a feedback channel of the active link, a transmitting end of the active link to perform ACM switching; detecting, by the receiving end of the standby link, a signal quality condition of the standby link, generating an ACM switching indication of the standby link, and informing, through a feedback channel, a transmitting end of the standby link to perform ACM switching; and performing, by the receiving end of the active link and the receiving end of the standby link, HSM selective reception on the services by transmitting the received services to each other.

Compared with the conventional art, after the above technical solution is adopted, with the method for transmitting services according to the embodiment of the present invention, asymmetrical services can be received and selective reception can be performed on the asymmetrical services, logic implementation and function division of the ACM and the HSM can be completely independent, the HSM function realizes service protection, the ACM function realizes link protection, the HSM function and the ACM function operate independently, and the system always operates in an optimal condition, so the transmission efficiency and the transmission reliability of the microwave system can be effectively improved.

Yet another embodiment of the present invention provides a transmitting terminal of a microwave communication device, so as to effectively improve transmission efficiency and transmission reliability of a microwave communication system when an ACM and an HSM are used coordinately in the microwave communication system.

In order to achieve the foregoing, an embodiment of the present invention adopts the following technical solution.

A transmitting terminal of the microwave communication device includes a service dual transmitting unit, a transmitting end of an active link, and a transmitting end of a standby link, the transmitting end of the active link and the transmitting end of the standby link being connected to the service dual transmitting unit, where both the transmitting end of the active link and the transmitting end of the standby link include an ACM unit, in which the service dual transmitting unit is configured to transmit services of a same path to the transmitting end of the active link and the transmitting end of the standby link;

the transmitting end of the active link is configured to receive the services transmitted by the service dual transmitting unit and an ACM switching indication fed back by a receiving end of the active link, perform ACM switching, according to the ACM switching indication fed back by the receiving end of the active link, on the services transmitted through the active link, and transmit the services;

the transmitting end of the standby link is configured to receive the services transmitted by the service dual transmitting unit and an ACM switching indication fed back by a receiving end of the standby link, perform ACM switching, according to the ACM switching indication fed back by the receiving end of the standby link, on the services transmitted through the standby link, and transmit the services; and the ACM unit is configured to control the services to perform ACM switching.

Compared with the conventional art, after the above technical solution is adopted, with the transmitting terminal of the microwave communication device according to the embodiment of the present invention, asymmetrical services can be transmitted, the ACM units of the transmitting end of the active link and the transmitting end of the standby link perform ACM switching respectively, so the transmission efficiency and the transmission reliability of the microwave system can be effectively improved. Moreover, the active link does not need to dispose the ACM service dual transmitting unit, two service dual transmitting units of the transmitting terminal are reduced to one, the ACMs of the active link and the standby link are switched independently without a coupling relationship, so design and implementation complexity of the system is reduced.

Still another embodiment of the present invention provides a receiving terminal of a microwave communication device, so as to effectively improve transmission efficiency and transmission reliability of a microwave communication system when an ACM and an HSM are used coordinately in the microwave communication system.

In order to achieve the foregoing, an embodiment of the present invention adopts the following technical solution.

A receiving terminal of a microwave communication device includes a receiving end of an active link, a receiving end of a standby link, the receiving end of the standby link being connected to the receiving end of the active link, where both the receiving end of the active link and the receiving end of the standby link include an ACM unit and an HSM unit, in which the ACM unit of the receiving end of the active link is configured to receive services transmitted by a transmitting end of the active link, and detect a signal quality condition of the active link at the same time, generate an ACM switching indication of the active link, and feed back a result to the transmitting end of the active link through a feedback channel to inform the transmitting end of the active link to perform ACM switching;

the ACM unit of the receiving end of the standby link is configured to receive the services transmitted by a transmitting end of the standby link, and detect a signal quality condition of the standby link at the same time, generate an ACM switching indication of the standby link, and feed back a result to the transmitting end of the standby link through a feedback channel to inform the transmitting end of the standby link to perform ACM switching; and the HSM unit is configured to perform HSM selective reception on the services.

Compared with the conventional art, after the above technical solution is adopted, with the receiving terminal of the microwave communication device according to the embodiment of the present invention, asymmetrical services can be received and selective reception can be performed on the asymmetrical services, logic implementation and function division of the ACM and the HSM can be completely independent, the HSM function realizes service protection, the ACM function realizes link protection, the HSM function and the ACM function operate independently, so the transmission efficiency and the transmission reliability of the microwave system can be effectively improved.

Yet still another embodiment of the present invention provides a system structure of a microwave communication device, so as to effectively improve transmission efficiency and transmission reliability of a microwave communication system when an ACM and an HSM are used coordinately in the microwave communication system.

In order to achieve the foregoing, an embodiment of the present invention adopts the following technical solution.

A system structure of the microwave communication device includes a receiving terminal, a transmitting terminal coordinated with the receiving terminal, and the receiving terminal receives services transmitted by the transmitting terminal, in which the receiving terminal includes a receiving end of an active link, a receiving end of a standby link, the receiving end of the standby link being connected to the receiving end of the active link, where both the receiving end of the active link and the receiving end of the standby link include an ACM unit and an HSM unit;

the ACM unit of the receiving end of the active link is configured to receive services transmitted by the active link, detect a signal quality condition of the active link at the same time, generate an ACM switching indication of the active link, and feed back a result to the transmitting end of the active link through a feedback channel to inform the transmitting end of the active link to perform ACM switching;

the ACM unit of the receiving end of the standby link is configured to receive services transmitted by the standby link, detect a signal quality condition of the standby link at the same time, generate an ACM switching indication of the standby link, and feed back a result to the transmitting end of the standby link through a feedback channel to inform the transmitting end of the standby link to perform ACM switching; and the HSM unit is configured to perform HSM selective reception on the services.

Compared with the conventional art, after the above technical solution is adopted, with the system structure of the microwave communication device according to the embodiment of the present invention, logic implementation and function division of the ACM and HSM of the active link and the standby link can be completely independent, the HSM function realizes service protection, the ACM function realizes link protection, the HSM function and the ACM function operate independently, and the system always operates in an optimal condition, the active link and standby link can transmit asymmetrical services, so the transmission efficiency and the transmission reliability of air interfaces can be improved. Also, no error code is introduced in HSM switching, so transmission reliability is improved. Moreover, the transmitting end of active link does not need to dispose an ACM service dual transmitting unit, the ACMs of the active link and standby link are switched independently without a coupling relationship, so design and implementation complexity of the system is reduced.

DETAILED DESCRIPTION OF THE EMBODIMENTS

A method, a transmitting terminal, a receiving terminal and a system structure for transmitting and receiving services are provided by an embodiment of the present invention, so as to implement a coordinated operation between an ACM and an HSM function in a microwave communication system, and effectively improve transmission efficiency and transmission reliability of the microwave communication system.

Embodiments of the present invention are further described in detail with reference to the accompanying drawings.

Figure 1:
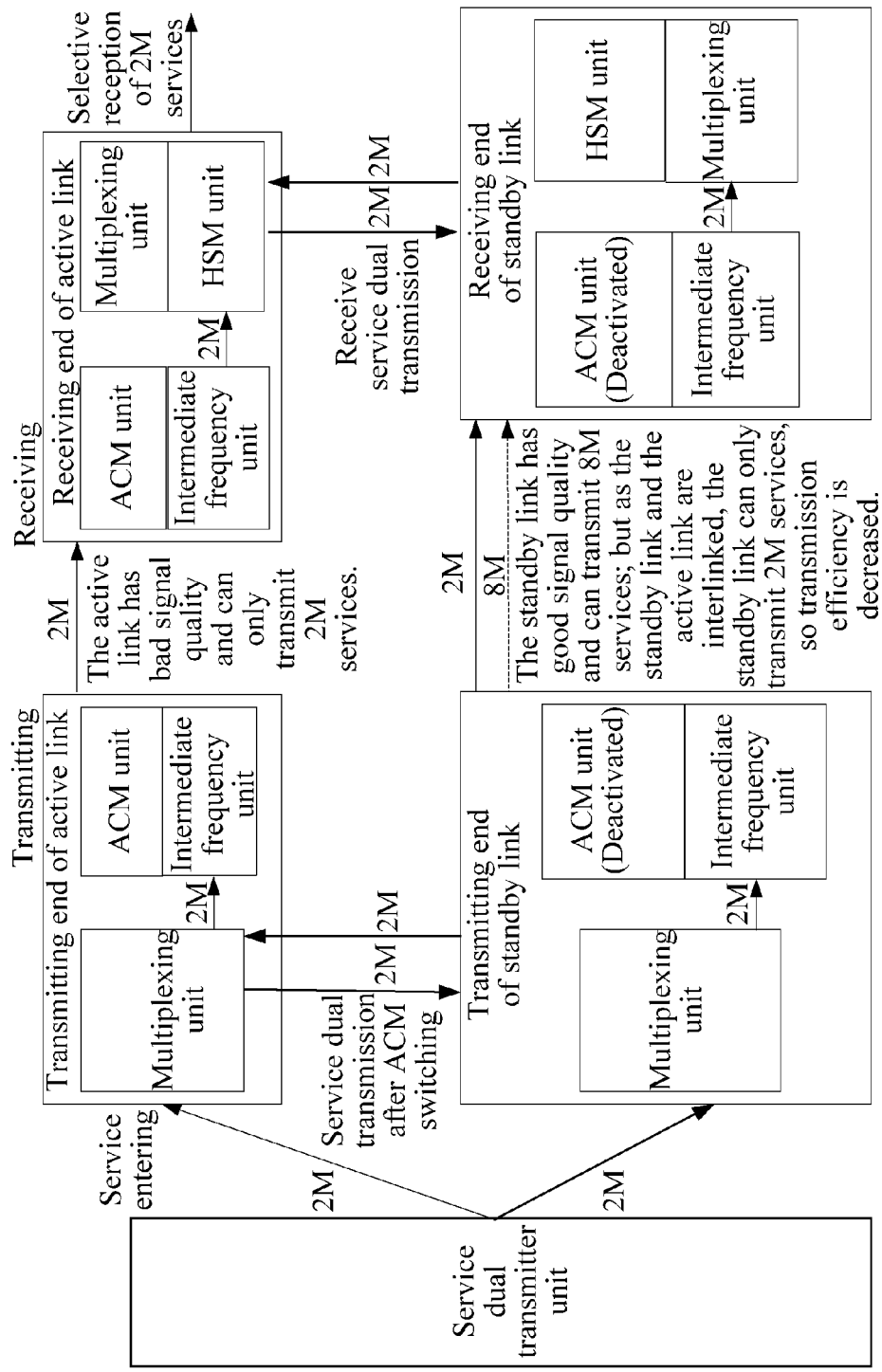
FIG. 1 is a schematic view of principles of a microwave communication system in which an ACM and an HSM are coordinated in the prior art.
Figure 2:
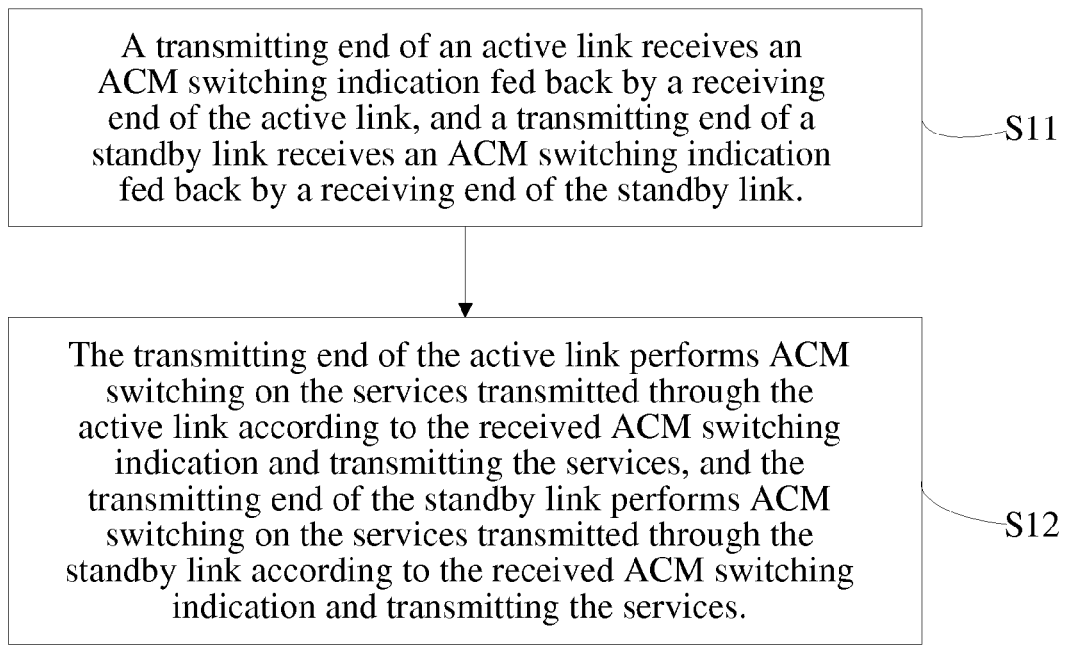
FIG. 2 is a flow chart of a method for transmitting services in microwave communication according to an embodiment of the present invention.

An embodiment of the present invention provides a method for transmitting services in microwave communication. As shown in FIG. 2, the method for transmitting services provided by the embodiment of the present invention includes the following steps.

In step S11, a transmitting end of an active link receives an ACM switching indication fed back by a receiving end of the active link, and a transmitting end of a standby link receives an ACM switching indication fed back by a receiving end of the standby link.

In step S12, the transmitting end of the active link performs ACM switching, according to the received ACM switching indication, on services transmitted through the active link and transmits the services, and the transmitting end of the standby link performs ACM switching, according to the received ACM switching indication, on services transmitted through the standby link and transmits the services.

Thus, with the method for transmitting services according to the embodiment of the present invention, logic implementation and function division of ACMs of the active link and the standby link are completely independent, the active link and the standby link may transmit asymmetrical services according to quality of respective air interface links, so the transmission reliability of services of the two links is guaranteed, and error codes are prevented from occurring when signal quality of the active link is greatly different from the signal quality of the standby link, so that transmission efficiency and the transmission reliability of the air interfaces are improved. Moreover, an ACM service dual transmitting unit of active link does not need to be disposed, two service dual transmitting units of the transmitting end are reduced to one, the ACMs of the active link and the standby link are switched independently without a coupling relationship, so design and implementation complexity of the system is reduced.

Besides step S11, the method for transmitting services provided by the present invention further includes the following steps.

The transmitting end of the active link and the transmitting end of the standby link feed back service bandwidth that can be actually used by respective links to a service dual transmitting unit.

The service dual transmitting unit transmits services with corresponding capacity to the transmitting end of the active link and the transmitting end of the standby link according to the selected maximum air interface bandwidth that can be actually used by the two links.

The transmitting end of the active link and the transmitting end of the standby link select services with capacity, which can be actually used by the respective links to transmit, from the services with corresponding capacity.

Thus, the services can be transmitted according to a maximum air interface bandwidth of the link, so the transmission efficiency is improved.

Moreover, the selecting, by the transmitting end of the active link and the transmitting end of the standby link, services with capacity, which can be actually used by the respective links to transmit, from the services with corresponding capacity specifically includes: selecting, by the transmitting end of the active link and the transmitting end of the standby link, according to a descending order of service priority, services with the capacity that can be actually used by the links to transmit, from the services with the corresponding capacity, for transmission.

Figure 3:
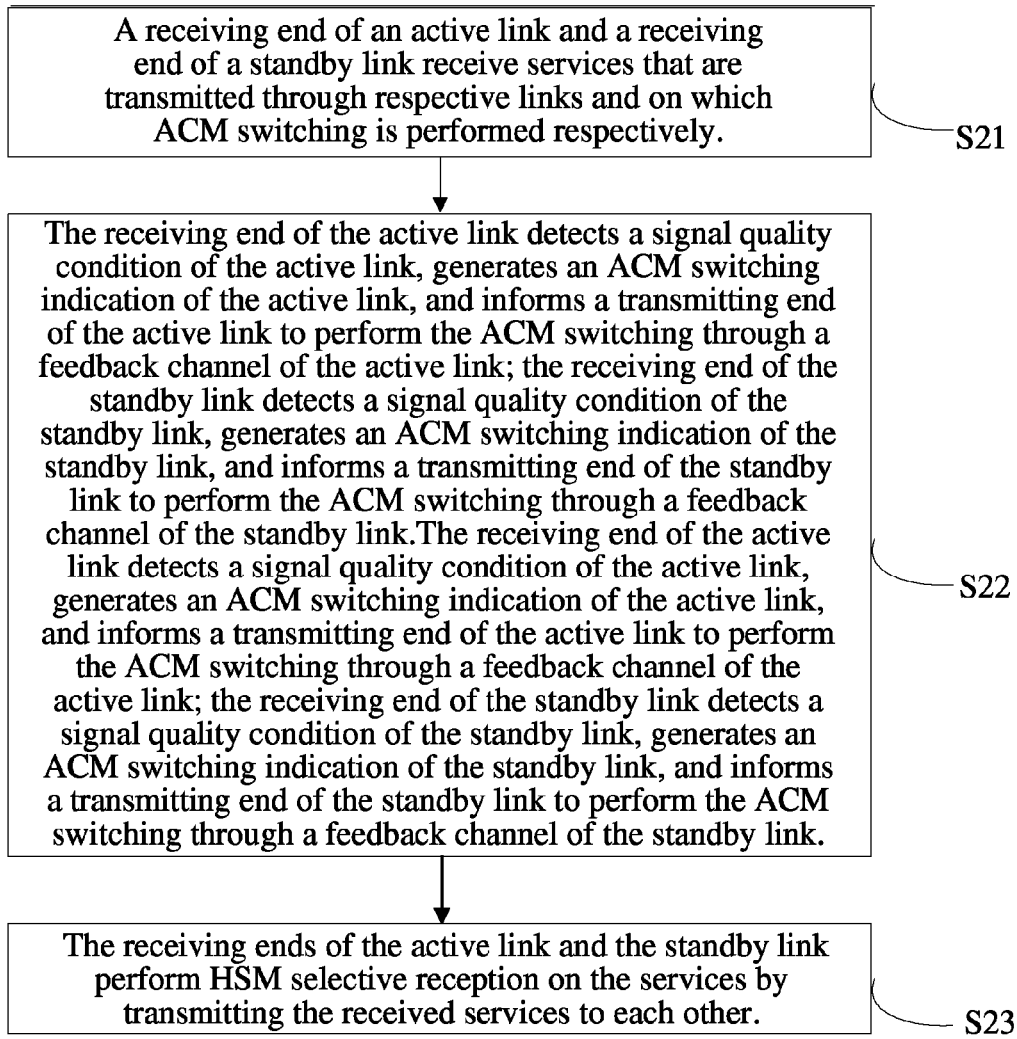
FIG. 3 is a flow chart of a method for receiving services in microwave communication according to an embodiment of the present invention.

Correspondingly, the embodiment of the present invention further provides a method for receiving services in microwave communication. As shown in FIG. 3, the method includes the following steps.

In step S21, a receiving end of an active link and a receiving end of a standby link receive services which are transmitted through each link and on which ACM switching is performed respectively.

The capacity of the received services may be inconsistent, and services of the two links may be asymmetrical.

In step S22, the receiving end of the active link detects a signal quality condition of the active link, generates an ACM switching indication of the active link, and informs, through a feedback channel of the active link, a transmitting end of the active link to perform ACM switching; the receiving end of the standby link detects a signal quality condition of the standby link, generates an ACM switching indication of the standby link, and informs, through a feedback channel of the standby link, a transmitting end of the standby link to perform ACM switching.

In step S23, the receiving end of the active link and the receiving end of the standby link perform HSM selective reception on the services by transmitting the received services to each other.

Since capacity of services transmitted by the active link and the standby link may be inconsistent and the services may be symmetrical or asymmetrical, the receiving end of the active link and the receiving end of the standby link should follow a standard for performing HSM selective service reception. The receiving end of the active link and the receiving end of the standby link transmit the received services and service information to each other. Hitless services are first selected according to quality of services of the two links, and the receiving end of the active link and the receiving end of the standby link select a service with a maximum capacity according to the capacity of the services of the two links when the quality of the services of the two links are the same. The specific method of selective reception includes the following steps.

The receiving end of the active link and the receiving end of the standby link transmit service quality information indicating service quality and ACM information indicating service capacity to each other.

The receiving end of the active link and the receiving end of the standby link judge a quality condition of the services according to the service quality information, and trigger HSM switching when the quality of services of the two link are different, and select services having better quality. Optionally, in this application document, whether the services have error codes or not, that is, the quality of the services, can be judged through error detection. As for the services, no error code represents good quality, error codes represent bad quality. Alternatively, an error ratio higher than a set threshold represents bad service quality, and an error ratio lower than the set threshold represents good service quality. Other universal standards in the industry may also be used for judging the quality of the services, which are not limited here.

The receiving end of the active link and the receiving end of the standby link trigger HSM switching according to the ACM information when the services of the two links have the same quality, and select a service with a maximum capacity.

Thus, with the method for transmitting services according to the embodiment of the present invention, asymmetrical services can be received and selective reception can be performed on the asymmetrical services, logic implementation and function division of the ACM and the HSM can be completely independent, the HSM function realizes service protection, the ACM function realizes link protection, the HSM function and the ACM function operate independently, and the system always operates in an optimal condition, so the transmission efficiency and transmission reliability of the microwave system can be effectively improved.

Figure 4:
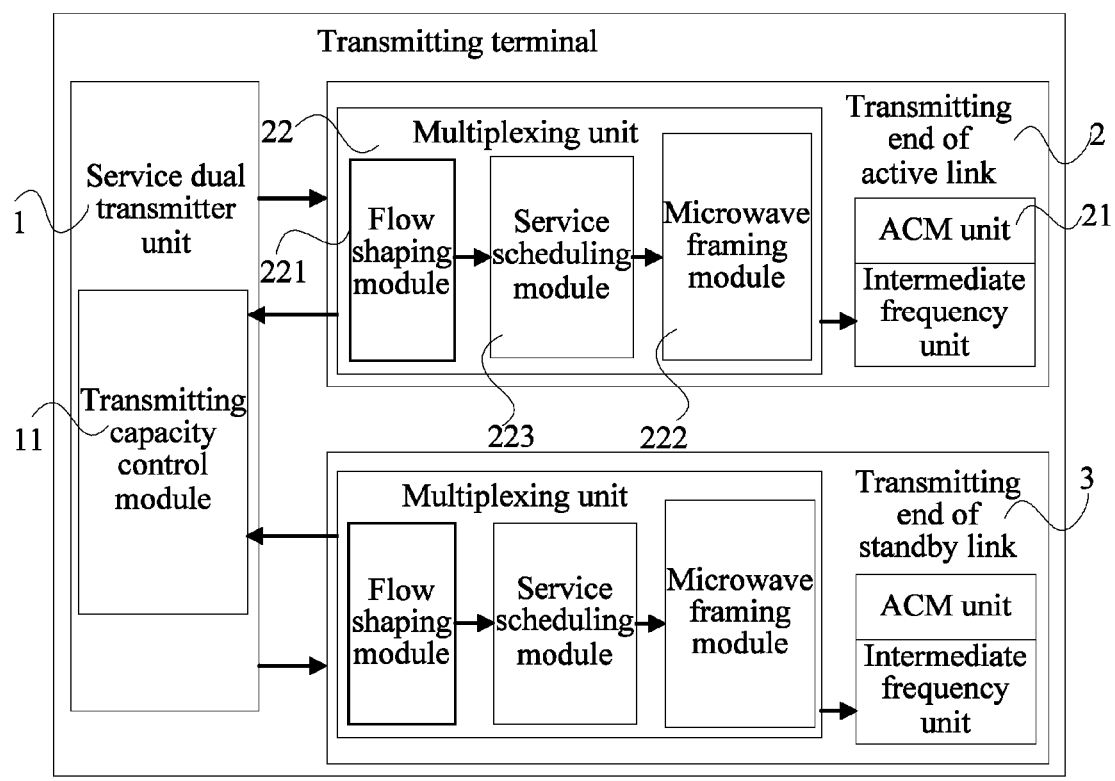
FIG. 4 is a structure block diagram of a transmitting terminal according to an embodiment of the present invention.

Correspondingly, the embodiment of the present invention further provides a transmitting terminal of microwave communication. Referring to a structure block diagram as shown in FIG. 4, the transmitting terminal includes a service dual transmitting unit 1, a transmitting end of an active link 2 and a transmitting end of an active link 3, the transmitting end of the active link 2 and the transmitting end of the standby link 3 being connected to the service dual transmitting unit 1, where both the transmitting end of the active link 2 and the transmitting end of the standby link 3 include an ACM unit 21.

The service dual transmitting unit 1 is configured to transmit services to the transmitting end of the active link 2 and the transmitting end of the standby link 3. The transmitting end of the active link 2 is configured to receive an ACM switching indication fed back by a receiving end of the active link, and perform ACM switching, according to the ACM switching indication fed back by the receiving end of the active link, on services transmitted through the active link and transmit the services.

The transmitting end of the standby link 3 is configured to receive the ACM switching indication fed back by a receiving end of the standby link, and perform ACM switching, according to the ACM switching indication fed back by the receiving end of the standby link, on the services transmitted through the standby link and transmit the services.

The ACM unit 21 is configured to control the services to perform ACM switching.

Thus, with the transmitting terminal of microwave communication according to the embodiment of the present invention, asymmetrical services can be transmitted, the ACM units 21 of the transmitting end of the active link 2 and the transmitting end of the standby link 3 perform ACM switching independently, so the transmission efficiency and transmission reliability of a microwave system can be effectively improved. Also, the ACM service dual transmitting unit of the active link does not need to be disposed, the transmitting end of the active link 2 and the transmitting end of the standby link 3 have no coupling relationship, so the design and implementation complexity of the system is reduced.

Further, the service dual transmitting unit 1 includes a transmitting capacity control module 11. The transmitting end of the active link 2 and the transmitting end of the standby link 3 feed back service bandwidth that can be actually used by respective links, to the transmitting capacity control module 11 of the service dual transmitting unit. The transmitting capacity control module 11 obtains maximum air interface bandwidth that can be actually used by the two links, controls the service dual transmitting unit 1 to transmit services with corresponding capacity to the transmitting end of the active link 2 and the transmitting end of the standby link 3 according to the maximum air interface bandwidth that can be actually used in the active link and the standby link.

Both the transmitting end of the active link 2 and the transmitting end of the standby link 3 include a multiplexing unit 22. The multiplexing unit 22 includes a flow shaping module 221, a service scheduling module 222, and a microwave framing module 223. The flow shaping module 221 enables the services to form a queue, and the service scheduling module 222 selects, according to a descending order of service priority, services with the capacity that can be actually used by the link, to transmit to the microwave framing module 223 for transmission.

Figure 5:
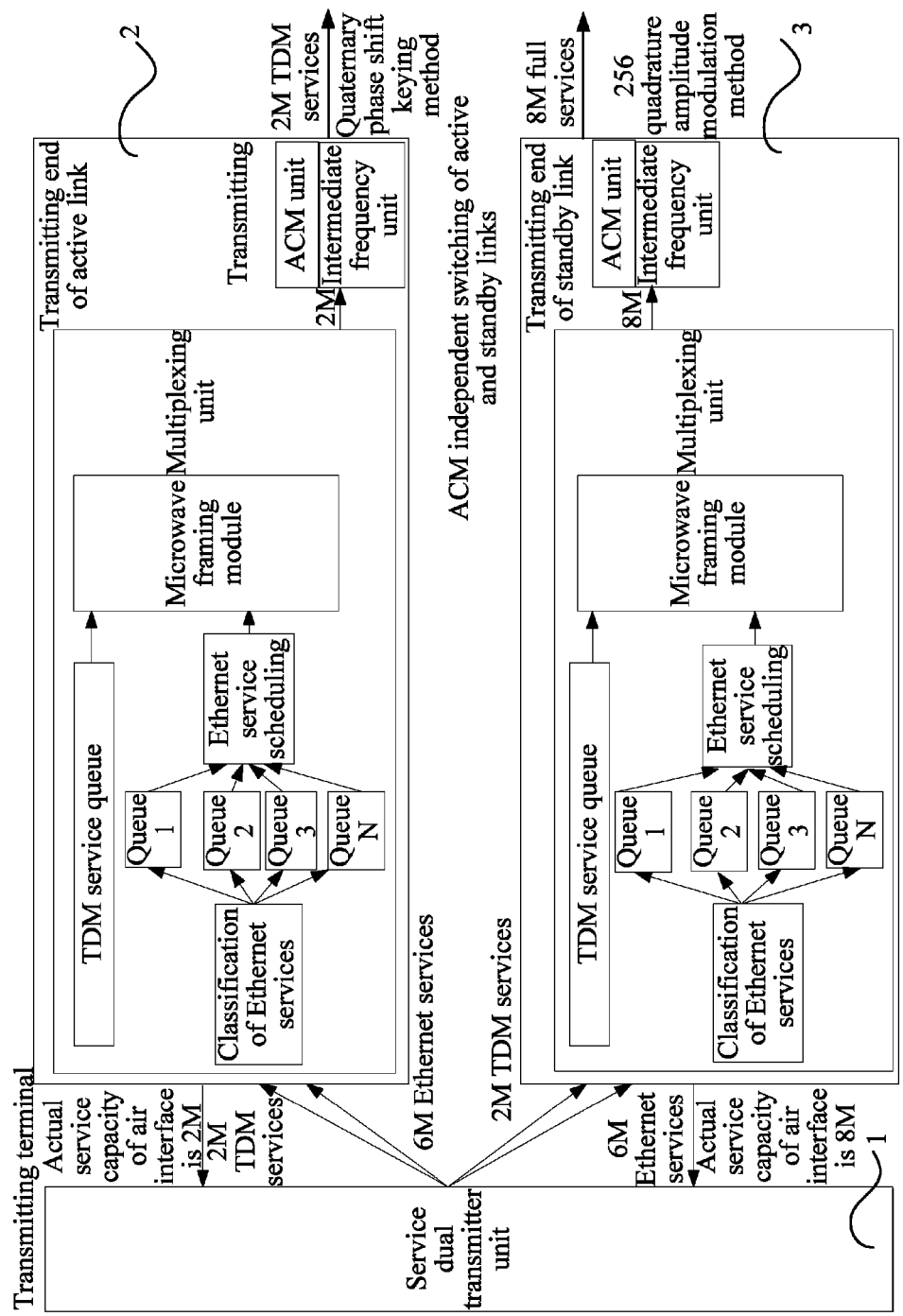
FIG. 5 is a schematic view of principles of a transmitting terminal according to an embodiment of the present invention.

A specific application method of the transmitting terminal is described with examples. Referring to a principle view as shown in FIG. 5, the transmitting end of the active link 2 and the transmitting end of the standby link 3 feed back, through the multiplexing unit 22, the service bandwidth that can be actually used by the respective links to the transmitting capacity control module 11 of the service dual transmitting unit 1, an actual service capacity of the air interface of the active link is 2M, and an actual service capacity of the air interface of the standby link is 8M. The transmitting capacity control module 11 informs the service dual transmitting unit 1 to transmit services, that is, the services with 8M capacity, to the transmitting end of the active link 2 and the transmitting end of the standby link 3 according to a maximum air interface bandwidth that can be actually used in the two links. The services with 8M capacity include time division multiplex service with 2M capacity and Ethernet service with 6M capacity. The service with 8M capacity forms a queue through the flow shaping module 221 at the receiving ends of the active link and the standby link at the same time, the service scheduling module 222 selects, according to a descending order of service priority, services with the capacity that can be actually used by the link, to transmit to the microwave framing module 223 for transmission. Since the service capacity of the air interface of the active link that can be used for transmission is 2M, the high priority services with 2M capacity are transmitted. The time division multiplex service has a higher priority than the Ethernet service, so the microwave framing module 223 of the transmitting end of the active link transmits the time division multiplex service with 2M capacity. The service capacity of the air interface of the standby link that can be used for transmission is 8M, so the microwave framing module 223 of the transmitting end of the standby link transmits full service with 8M capacity. In the process of transmitting the services, the ACM units 21 of the transmitting end of the active link 2 and the transmitting end of the standby link 3 perform ACM switching, according to the ACM switching indication fed back by the receiving ends of respective links, on the services transmitted by the link. The active link adopts a quaternary phase shift keying method for service transmission while the standby link adopts a 256 quadrature amplitude modulation method for service transmission. Thus, with the transmitting terminal according to the embodiment of the present invention, the active link and the standby link can transmit asymmetrical services, and since the active link and the standby link perform ACM switching respectively and independently, the transmission efficiency and transmission reliability of the microwave system can be effectively improved. Also, the ACM service dual transmitting unit of the active link does not need to be disposed, the transmitting end of the active link 2 and the transmitting end of the standby link 3 have no coupling relationship, so the design and implementation complexity of the system is reduced.

Figure 6:
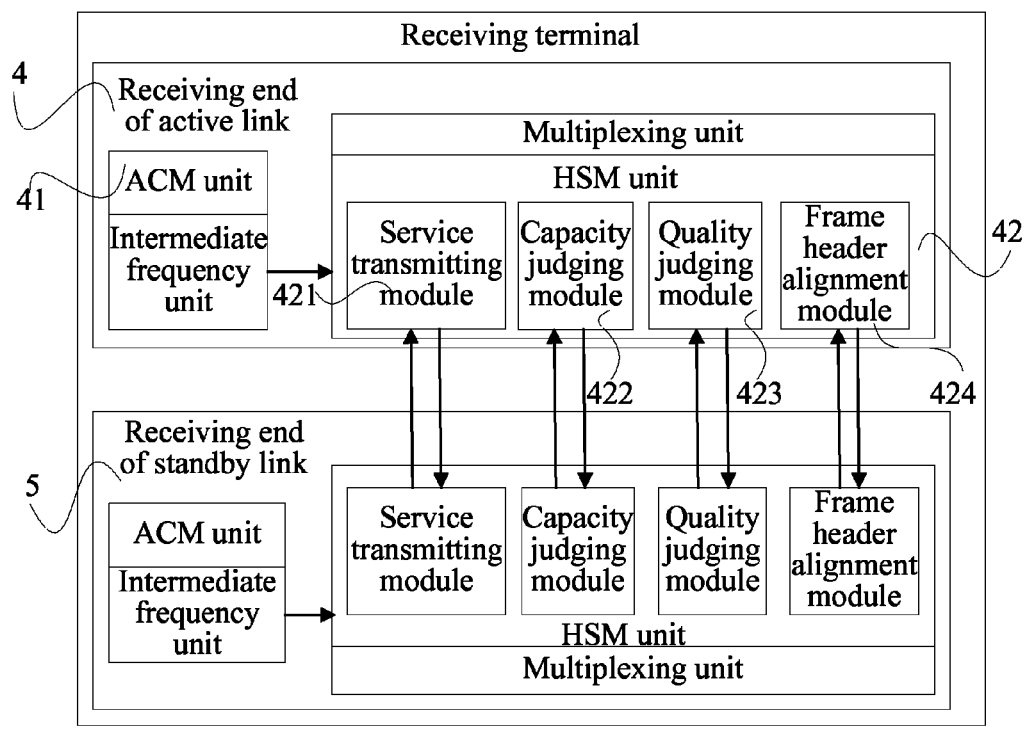
FIG. 6 is a structure block diagram of a receiving terminal according to an embodiment of the present invention.

Moreover, the embodiment of the present invention further provides a receiving terminal of microwave communication. Referring to a structure block diagram as shown in FIG. 6, the receiving terminal includes a receiving end of an active link 4, a receiving end of a standby link 5, the receiving end of the standby link 5 being connected to the receiving end of the active link 4, where both the receiving end of the active link 4 and the receiving end of the standby link 5 include an ACM unit 41 and an HSM unit 42.

The ACM unit 41 of the receiving end of the active link 4 is configured to receive services transmitted by the active link, and detect a signal quality condition of the active link at the same time, generate an ACM switching indication of the active link, and feed back a result to a transmitting end of the active link through a feedback channel to inform the transmitting end of the active link to perform ACM switching.

The ACM unit 41 of the receiving end of the standby link 5 is configured to receive services transmitted by the transmitting end of the standby link, and detect a signal quality condition of the standby link at the same time, generate an ACM switching indication of the standby link, and feed back a result to a transmitting end of the standby link through a feedback channel to inform the transmitting end of the standby link to perform ACM switching.

The HSM unit 42 is configured to perform HSM selective reception on the services.

Thus, with the receiving terminal of the microwave communication according to the embodiment of the present invention, asymmetrical services can be received and selective reception can be preformed on the asymmetrical services, so logic implementation and function division of the ACM and the HSM can be completely independent, the HSM function realizes service protection, the ACM function realizes link protection, and the HSM function and the ACM function operate independently, so that the transmission efficiency and transmission reliability of the microwave system can be effectively improved.

The HSM unit 42 includes a service transmitting module 421, a capacity judging module 422, a quality judging module 423, and a frame header alignment module 424.

The service transmitting module 421 is configured to transmit received services and associated clock information between the receiving end of the active link and the receiving end of the standby link, and perform selective service reception.

The capacity judging module 422 is configured to transmit ACM information and judge capacity of services of the two links.

The quality judging module 423 is configured to transmit signal quality information to each other and judge the quality of services of the two links.

The frame header alignment module 424 is configured to transmit frame header information, align the services, and guarantee hitless switching of the HSM.

Figure 7:
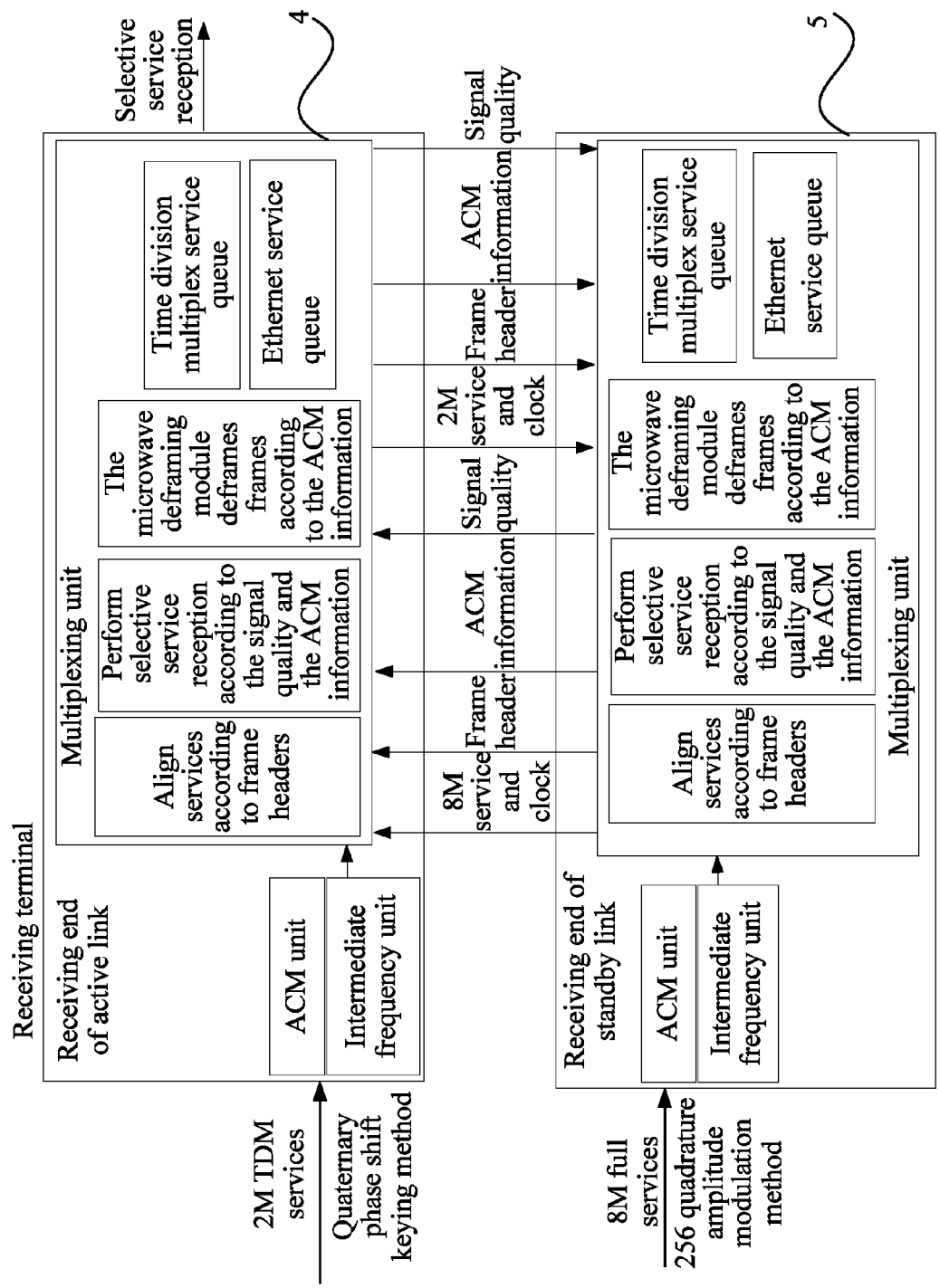
FIG. 7 is a schematic view of principles of a receiving terminal according to an embodiment of the present invention.

A specific application method of the receiving terminal is described in the following with an example of performing selective reception on the services of the two links transmitted by the above transmitting terminal. Referring to a structure block diagram as shown in FIG. 6 and a principle view as shown in FIG. 7, time division multiplex services with 2M capacity are transmitted to the receiving end of the active link 4 through the active link, and services with capacity 8M including the time division multiplex services with 2M capacity and Ethernet services with 6M capacity are transmitted to the receiving end of the standby link 5 through the standby link. Since the services received by two links are asymmetrical, in order to perform the HSM selective reception, the two links transmit four types of information to each other through four modules of the HSM unit, and the four information include service and associated clock information, frame header information, ACM information, and signal quality information. The ACM information indicates the capacity of services of the two links, the signal quality information indicates the quality of the services of the two links, and the frame header signal is configured to align services. The service receiving module 421 transmits the service and associated clock information to each other, and performs selective service reception according to the results of the capacity judging module and the quality judging module. The capacity judging module 422 transmits the ACM information to each other. The quality judging module 423 transmits the signal quality information to each other. The frame header alignment module 424 transmits the frame header information to each other. First, the service receiving module 421 transmits the service and associated clock information to each other. Since the services of the two links have different delay when passing through different transmission paths, the services need to be aligned during service selection to guarantee hitless switching. Therefore, the frame header alignment modules 424 of the two links align, according to the frame header information, the services of the two links received by the service receiving modules 421. Second, the quality judging module 423 judges the quality of services of the two links according to the signal quality information. When the services of the two links have different quality, the service receiving module 421 triggers HSM switching according to the result of the quality judging module, and selects the hitless service, that is, the service of better quality. When services of the two links have the same quality, the capacity judging module 422 judges the capacity of the services of the two links through the ACM information, and the service receiving module 421 triggers HSM switching according to the result of the quality judging module and selects a service with a maximum capacity. It should be noted here that, when the services of the two links have the same capacity and quality, the receiving terminal can randomly select services of one link according to an actual condition and configuration. Of course, in order to perform the selective service reception, the receiving process further includes de-framing framed services according to the ACM information, the description of which is omitted here.

Figure 8:
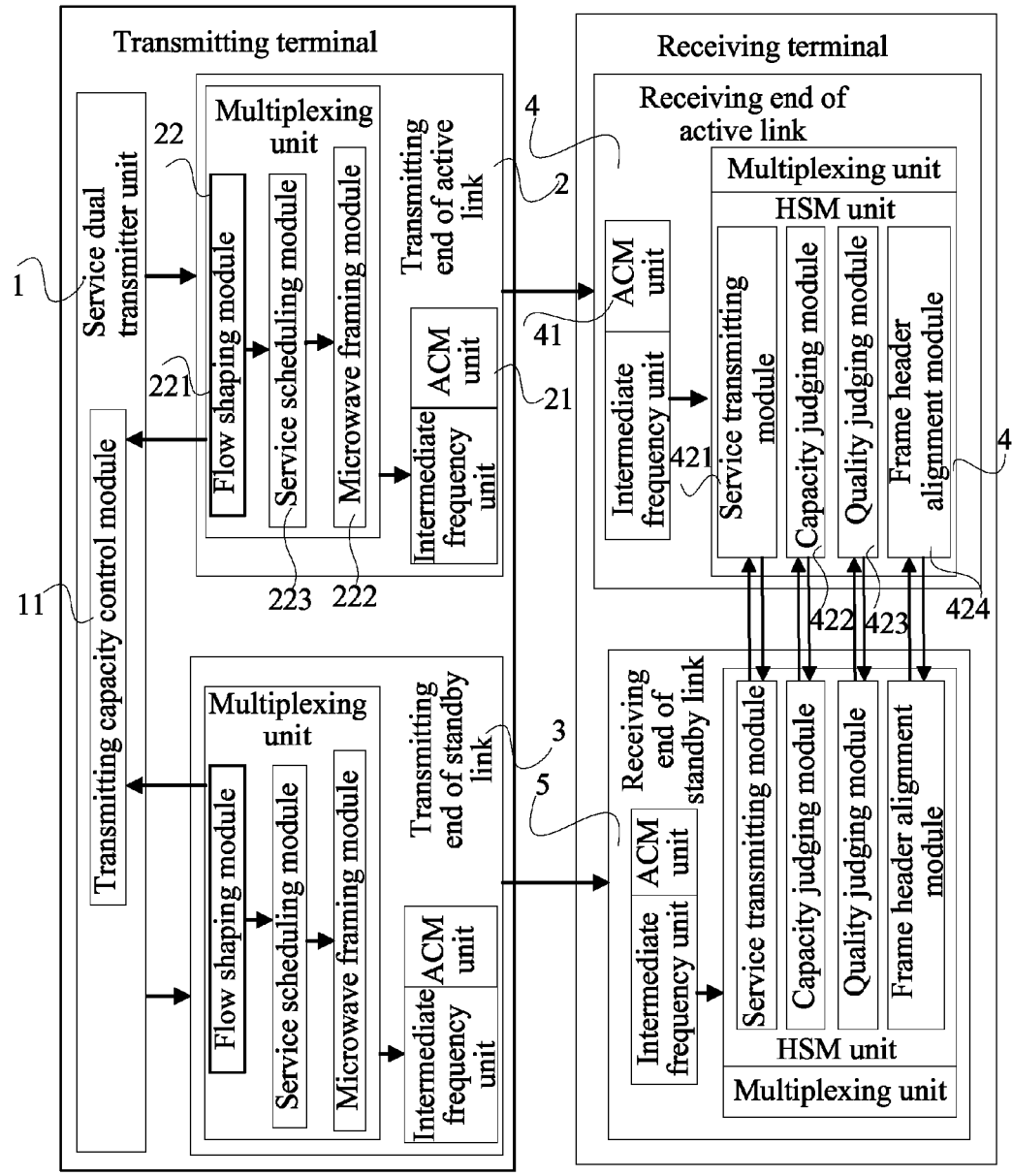
FIG. 8 is a structure block diagram of a microwave communication system according to an embodiment of the present invention.

Moreover, the embodiment of the present invention further provides a system structure of microwave communication. Referring to FIG. 8, the system structure includes a receiving terminal, a transmitting terminal coordinated with the receiving terminal, and the receiving terminal receives services transmitted by the transmitting terminal.

The receiving terminal includes a receiving end of an active link 4, a receiving end of a standby link 5, the receiving end of the standby link 5 being connected to the receiving end of the active link 4, where both the receiving end of the active link 4 and the receiving end of the standby link 5 include an ACM unit 41 and an HSM unit 42.

The ACM unit 41 of the receiving end of the active link 4 is configured to receive services which are transmitted by the active link and on which ACM switching is performed, detect a signal quality condition of the active link at the same time, generate an ACM switching indication of the active link, and feed back a result to a transmitting end of the active link 2 through a feedback channel to inform the transmitting end of the active link 2 to perform ACM switching.

The ACM unit 41 of the receiving end of the standby link 5 is configured to receive services which are transmitted by the standby link and on which ACM switching is performed, detect a signal quality condition of the standby link at the same time, generate an ACM switching indication of the standby link, and feed back a result to a transmitting end of the standby link 3 through a feedback channel to inform the transmitting end of the standby link 3 to perform ACM switching.

The HSM unit 42 is configured to perform HSM selective reception on the services.

Moreover, the transmitting terminal further includes a service dual transmitting unit 1, the transmitting end of the active link 2, and the transmitting end of the standby link 3, the transmitting end of the active link 2 and the transmitting end of the standby link 3 being connected to the service dual transmitting unit 1, where both the transmitting end of the active link 2 and the transmitting end of the standby link 3 include the ACM unit.

The service dual transmitting unit 1 is configured to transmit services of the same link to the transmitting end of the active link 2 and the transmitting end of the standby link 3.

The transmitting end of the active link 2 is configured to receive the services transmitted by the service dual transmitting unit 1 and an ACM switching indication fed back by the receiving end of the active link 4, and perform ACM switching, according to the received ACM switching indication, on the services transmitted through the active link and transmit the services.

The transmitting end of the standby link 3 is configured to receive the services transmitted by the service dual transmitting unit 1 and an ACM switching indication fed back by the receiving end of the standby link 5, and perform ACM switching, according to the received ACM switching indication, on the services transmitted through the standby link and transmit the services.

The ACM unit 41, configured to control the services to perform ACM switching.

In the system structure of the microwave communication provided by the embodiments of the present invention, the transmitting terminal and the receiving terminal adopt the transmitting terminal and the receiving terminal provided by the embodiment of the present invention, which are already described in the foregoing in detail, and the description is omitted here.

Figure 9:
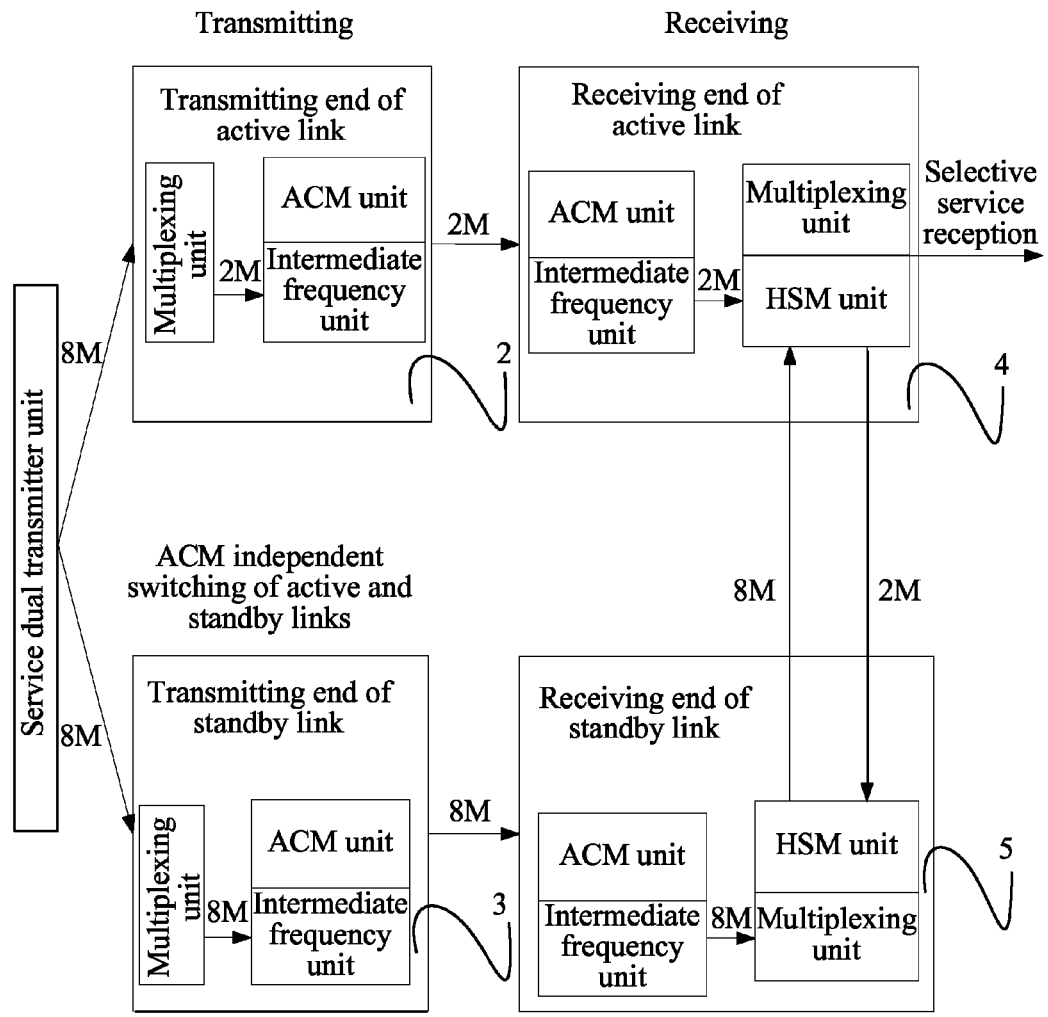
FIG. 9 is a schematic view of principles of a microwave communication system according to an embodiment of the present invention.

The embodiment of the present invention provides the system structure of microwave communication. Referring to a structure diagram as shown in FIG. 8 and a principle view as shown in FIG. 9, the service dual transmitting unit 1 transmits the services of the same link to the active link and the standby link at the same time to transmit. During the transmission, the ACM unit of the transmitting end of the active link 2 and the ACM unit of the transmitting end of the standby link 3 keep on, and ACM switching is performed independently according to the ACM switching indication fed back by the receiving ends of respective links. The bandwidth of master and slave services may be inconsistent. The receiving end of the active link 4 and the receiving end of the standby link 5 transmit services and service information to each other, and perform the HSM selective reception. Thus, the logic implementation and function division of the ACM and the HSM of the active link and the standby link can be completely independent, the HSM function realizes service protection, the ACM function realizes link protection, the HSM function and the ACM function operate independently, and the system always operates in an optimal condition, the active link and the standby link can transmit the asymmetrical services, so the transmission efficiency of the air interface can be improved, and no error code is introduced in HSM switching, so the transmission reliability is improved. Moreover, an ACM service dual transmitting unit of the transmitting end of the active link does not need to be disposed, the ACMs of the active link and the standby link are switched independently without a coupling relationship, so that the design and implementation complexity of the system is reduced.

It should be understood that the above descriptions are merely specific embodiments of the present invention, but the scope of the present invention is not limited thereto. Within the technical scope disclosed by the present invention, any modification or replacement can be easily thought by any person skilled in the art should fall within the protection scope of the present invention as defined by the appended claims.

What is claimed is:

1. A method for transmitting services in microwave communication, comprising:
   receiving, by a transmitting end of an active link, an Adaptive Code and Modulation (ACM) switching indication fed back by a receiving end of the active link, and receiving, by a transmitting end of a standby link, an ACM switching indication fed back by a receiving end of the standby link; and
   performing, by the transmitting end of the active link, ACM switching, according to the received ACM switching indication, on services transmitted through the active link and transmitting the services; performing, by the transmitting end of the standby link, ACM switching, according to the received ACM switching indication, on services transmitted through the standby link, and transmitting the services,
   wherein while the transmitting end of the active link receives the ACM switching indication fed back by the receiving end of the active link, and the transmitting end of the standby link receives the ACM switching indication fed back by the receiving end of the standby link, the method further comprises:
   feeding back, by the transmitting end of the active link and the transmitting end of the standby link, service bandwidth that can be actually used by respective links, to a service dual transmitting unit;
   selecting, by the service dual transmitting unit, a maximum air interface bandwidth that can be actually used by the two links, to transmit services with corresponding capacity to the transmitting end of the active link and the transmitting end of the standby link; and
   selecting, by the transmitting end of the active link and the transmitting end of the standby link, services with capacity that can be actually used by the respective links for transmission from the services with corresponding capacity.

2. The method according to claim 1, wherein the selecting, by the transmitting end of the active link and the transmitting end of the standby link, services with capacity that can be actually used by the respective links for transmission from the services with corresponding capacity specific comprises:
   selecting, by the transmitting end of the active link and the transmitting end of the standby link, according to a descending order of service priority, services with the capacity that can be actually used by the links for transmission from the services with corresponding capacity.

3. A method for receiving services in microwave communication, comprising:
   receiving, by a receiving end of an active link and a receiving end of a standby link, services which are transmitted through respective links and on which Adaptive Code and Modulation (ACM) switching is performed respectively;
   detecting, by the receiving end of the active link, a signal quality condition of the active link, generating an ACM switching indication of the active link, and informing, through a feedback channel of the active link, a transmitting end of the active link to perform ACM switching;
   detecting, by the receiving end of the standby link, a signal quality condition of the standby link, generating an ACM switching indication of the standby link, and informing, through a feedback channel of the standby link, a transmitting end of the standby link to perform ACM switching; and
   performing, by the receiving end of the active link and the receiving end of the standby link, Hitless Switch Mode (HSM) selective reception on the services by transmitting the received services to each other.

4. The method according to claim 3, wherein the performing, by the receiving end of the active link and the receiving end of the standby link, the HSM selective reception on the services by transmitting the received services to each other is specifically:
   selecting, by the receiving end of the active link and the receiving end of the standby link, hitless services first according to quality of the services of the two links, and selecting services with a maximum capacity according to the capacity of the two services when the services of the two links have the same quality.

5. The method according to claim 4, wherein the selecting, by the receiving end of the active link and the receiving end of the standby link, the hitless services first according to the quality of the services of the two links, and selecting the services with the maximum capacity according to the capacity of the services of the two links when the services of the two links have the same quality specifically is specifically:

transmitting, by the receiving end of the active link and the receiving end of the standby link, service quality information indicating service quality and ACM information indicating service capacity to each other;

judging, by the receiving end of the active link and the receiving end of the standby link, a quality condition of the services according to the service quality information, and triggering HSM switching when the services of the two links have different quality and selecting the hitless service; and triggering, by the receiving end of the active link and the receiving end of the standby link, HSM switching according to the ACM information when the services of the two links have the same quality, and selecting the service with the maximum capacity.

6. A transmitting terminal of a microwave communication device, comprising:

a service dual transmitting unit, a transmitting end of an active link and a transmitting end of a standby link, the transmitting end of the active link and the transmitting end of the standby link being connected to the service dual transmitting unit, wherein both the transmitting end of the active link and the transmitting end of the standby link comprise an Adaptive Code and Modulation (ACM) unit;

the service dual transmitting unit is configured to transmit services of a same path to a receiving end of the active link and a receiving end of the standby link;

the transmitting end of the active link is configured to receive the services transmitted by the service dual transmitting unit and an ACM switching indication fed back by the receiving end of the active link, and perform ACM switching, according to the ACM switching indication fed back by the receiving end of the active link, on the services transmitted through the active link and transmit the services;

the transmitting end of the standby link is configured to receive the services transmitted by the service dual transmitting unit and the ACM switching indication fed back by the receiving end of the standby link, and perform ACM switching, according to the ACM switching indication fed back by the receiving end of the standby link, on the services transmitted through the standby link and transmit the services; and the ACM unit is configured to control the services to perform ACM switching.

7. The transmitting terminal according to claim 6, wherein the service dual transmitting unit comprises a capacity control module, configured to receive service bandwidth that can be actually used by respective links and fed back by the transmitting end of the active link and the transmitting end of the standby link, and control the service dual transmitting unit to transmit services with corresponding capacity to the transmitting end of the active link and the transmitting end of the standby link according to a maximum air interface bandwidth that can be actually used in the two links.

8. The transmitting terminal according to claim 6, wherein both the transmitting end of the active link and the transmitting end of the standby link comprise a flow shaping module, a service scheduling module, and a microwave framing module, and the flow shaping module, the service scheduling module, and the microwave framing module are configured to select services with the capacity that can be actually used by the respective links for transmission from the service received by the service dual transmitting unit according to a descending order of service priority.

9. A receiving terminal of a microwave communication device, comprising:

a receiving end of an active link, and a receiving end of a standby link, the receiving end of the standby link being connected to the receiving end of the active link, wherein both the receiving end of the active link and the receiving end of the standby link comprise an Adaptive Code and Modulation (ACM) unit and a Hitless Switch Mode (HSM) unit;

the ACM unit of the receiving end of the active link is configured to receive services which are transmitted by a transmitting end of the active link and on which ACM switching is performed respectively, and detect a signal quality condition of the active link at the same time, generate an ACM switching indication of the active link, and feed back a result to the transmitting end of the active link through a feedback channel to inform the transmitting end of the active link to perform ACM switching;

the ACM unit of the receiving end of the standby link is configured to receive the services transmitted by a transmitting end of the standby link and on which ACM switching is performed, and detect a signal quality condition of the standby link at the same time, generate the ACM switching indication of the standby link, and feed back a result to the transmitting end of the standby link through the feedback channel to inform the transmitting end of the standby link to perform ACM switching; and the HSM unit is configured to perform HSM selective reception on the services.

10. The receiving terminal according to claim 9, wherein the HSM unit comprises:

a service transmitting module, configured to transmit the received services and associated clock information between the receiving end of the active link and the receiving end of the standby link, and perform selective service reception;

a capacity judging module, configured to transmit ACM information to each other and judge capacity of services of the two links;

a quality judging module, configured to transmit signal quality information to each other and judge quality of services of the two links; and a frame header alignment module, configured to transmit frame header information to each other, align the services, and ensure hitless switching of the HSM.

11. A system structure of a microwave communication device, comprising: a receiving terminal, a transmitting terminal coordinated with the receiving terminal, and the receiving terminal receiving services transmitted by the transmitting terminal, wherein the receiving terminal comprises a receiving end of an active link and a receiving end of a standby link, the receiving end of the active link and the receiving end of the standby link being connected to the receiving end of the active link, wherein both the receiving end of the active link and the receiving end of the standby link comprise an Adaptive Code and Modulation (ACM) unit and an Hitless Switch Mode (HSM) unit;

the ACM unit of the receiving end of the active link is configured to receive services transmitted by the active link, detect a signal quality condition of the active link at the same time, generate an ACM switching indication of the active link, and feed back a result to the transmitting end of the active link through a feedback channel to inform the transmitting end of the active link to perform ACM switching;

the ACM unit of the receiving end of the standby link is configured to receive services transmitted by the standby link, detect a signal quality condition of the standby link at the same time, generate an ACM switching indication of the standby link, and feed back a result to the transmitting end of the standby link through a feedback channel to inform the transmitting end of the standby link to perform ACM switching; and the HSM unit, configured to perform HSM selective reception on the services.

12. The system structure according to claim 11, wherein the transmitting terminal comprises a service dual transmitting unit, and the transmitting end of the active link and the transmitting end of the standby link, the transmitting end of the active link and the transmitting end of the standby link being connected to the service dual transmitting unit, wherein both the transmitting end of the active link and the transmitting end of the standby link comprise the ACM unit;

the service dual transmitting unit is configured to transmit services of the same link to the transmitting end of the active link and the transmitting end of the standby link;

the transmitting end of the active link is configured to receive the services transmitted by the service dual transmitting unit and the ACM switching indication fed back by the receiving end of the active link, and perform ACM switching, according to the ACM switching indication fed back by the receiving end of the active link, on the services transmitted through the active link and transmit the services;

the transmitting end of the standby link is configured to receive the services transmitted by the service dual transmitting unit and the ACM switching indication fed back by the receiving end of the standby link, and perform ACM switching, according to the ACM switching indication fed back by the receiving end of the standby link, on the services transmitted through the standby link and transmit the services; and the ACM unit of the transmitting terminal is configured to control the services to perform ACM switching.

13. The system structure according to claim 12, wherein the service dual transmitting unit comprises a capacity control module, configured to receive service bandwidth actually that can be actually used by respective links fed back by the transmitting end of the active link and the transmitting end of the standby link, and control the service dual transmitting unit to transmit services with corresponding capacity to the transmitting end of the active link and the transmitting end of the standby link according to a maximum air interface bandwidth that can be actually used in the two links.

14. The system structure according to claim 12, wherein both the transmitting end of the active link and the transmitting end of the standby link comprise a capacity shaping module, a service scheduling module, and a microwave framing module, and the capacity shaping module, the service scheduling module, and the microwave framing module are configured to select services with the capacity being the services with the capacity that can be actually used by the links for transmission from the services with corresponding capacity according to a descending order of service priority.

15. The system structure according to claim 11, wherein the HSM unit comprises:

a service transmitting module, configured to transmit the received service and associated clock information to each other between the receiving end of the active link and the receiving end of the standby link, and perform the selective service reception;

a capacity judging module, configured to transmit ACM information and judge the capacity of services of the two links;

a quality judging module, configured to transmit signal quality information to each other and judge the quality of services of the two links; and a frame header alignment module, configured to transmit frame header information to each other, align the services, and ensure hitless switching of the HSM.

* * * * *

UNITED STATES PATENT AND TRADEMARK OFFICE
CERTIFICATE OF CORRECTION

PATENT NO. : 8,483,047 B2
APPLICATION NO. : 13/012345
DATED : July 9, 2013
INVENTOR(S) : Xuekun Zhang It is certified that error appears in the above-identified patent and that said Letters Patent is hereby corrected as shown below:

In the Claims:

Claim 2, Column 14, line 25 "capacity specific comprises" should read

-- capacity specifically comprises --.

Signed and Sealed this
Twenty-fourth Day of September, 2013

Teresa Stanek Rea
*Deputy Director of the United States Patent and Trademark Office*